United States Patent

[11] 3,558,861

[72] Inventors William O. Collins;
 Dan P. Hunt; Leroy D. Wilder, Las Vegas, Nev.
[21] Appl. No. 727,416
[22] Filed May 8, 1968
[45] Patented Jan. 26, 1971
[73] Assignee EG & G, Inc.
 Bedford, Mass.
 a corporation of Massachusetts

[54] DISPLACEMENT MEASURING SYSTEM
 11 Claims, 8 Drawing Figs.
[52] U.S. Cl..................................................... 235/61.11,
 250/219; 33/125
[51] Int. Cl..................................................... G06k 7/10,
 G01r 21/30; G01b 11/22
[50] Field of Search........................................... 235/61.11,
 61.115; 250/219ID; 33/1250, 126.5, 126.6

[56] References Cited
UNITED STATES PATENTS
3,034,217 5/1962 Mayes et al.................. 235/61.11UX Primary Examiner—Daryl W. Cook
Attorneys—Ralph L. Cadwallader and Cadwallader and Kelly

ABSTRACT: A displacement measurement system having a support; a storage reel, reader head and electronics package mounted on the support and an elongated tape threaded through the reader head with one end connected to the storage reel and its other end connected to the object, the displacement of which is to be measured. The tape has a plurality of groups of light conduits spaced along its length at predetermined intervals, with the conduits of each group coded to indicate linear displacement or a function related thereto. A set of photodetectors indicate the passage of light through the tape where the conduits are located.

PATENTED JAN 26 1971

WILLIAM O. COLLINS
DAN P. HUNT
LEROY D. WILDER
INVENTORS

Fig. 1.

BY Ralph L. Cadwallader
Cadwallader and Kelly

ATTORNEYS

WILLIAM O. COLLINS
DAN P. HUNT
LEROY D. WILDER
INVENTORS

BY Cadwallader and Kelly

ATTORNEYS

PATENTED JAN 26 1971 3,558,861

WILLIAM O. COLLINS
DAN P. HUNT
LEROY D. WILDER
INVENTORS

BY Ralph R. Cadwallader
Cadwallader and Kelly
ATTORNEYS

DISPLACEMENT MEASURING SYSTEM

The present invention relates to displacement measurement systems and in particular to an active system having a digital output for indicating linear displacement or a function related thereto. It has particular use in open channel water distribution and storage systems where water levels, gate openings and other values need to be known continually, although its utility is even more general.

PRIOR ART

In one type of system for gauging liquid levels in storage tanks a motor drive raises a steel tape and associated float until the float clears the surface of liquid. The steel tape has two columns of perforations coded lengthwise along the tape. In measuring depth the tape must be raised sufficiently to identify the interval of distance along it in which the float cleared the water. This is done by binary summing of the coded perforations lengthwise within this or the preceeding interval. Each time a level measurement is made the motor drive must be actuated so to raise the tape. This system does not have an output that indicates continuously the liquid level.

OBJECTS

Accordingly a primary object of the present invention is to provide in a system for measuring linear displacement, an output which continuously indicates linear displacement.

A concomitant object is to provide a measurement system whereby changes in measured value such as scale changes and changes in scaling units can be accomplished easily and economically.

In a number of applications, such as the previously mentioned water distribution and storage systems, it is desirable that displacement data be in form suitable for transmission over great distances. Thus, still another object of the present invention is to provide a displacement measurement system in which the output data are in a form suitable for application to telephone or radiofrequency transmission circuits.

A further object of the invention is to provide a new and improved displacement measurement system that shall be economical and rugged in construction, light in weight, portable and self-contained except for power which must be supplied locally, easily operable and thoroughly effective and reliable in operation.

SUMMARY OF THE INVENTION

The system of the present invention measures basically the linear displacement of an object by means of groups of coded light conduits located at predetermined points on a tape which passes between a set of lamps and a set of photodetectors that sense the light passing through the conduits of each group. A set of bistable memory elements indicate which photodetectors sensed light and provide a coded output that indicates a linear distance with respect to some reference point, a function of such a distance, or any arbitrary value desired. Circuits are provided to turn the lamps on and off and to reset the memory elements. Except when the memory elements are being reset, there is always a coded output.

Other objects and advantages of the present invention will become apparent from the following description read in conjunction with the accompanying drawings in which:

DETAILED DESCRIPTION

Figure 1:
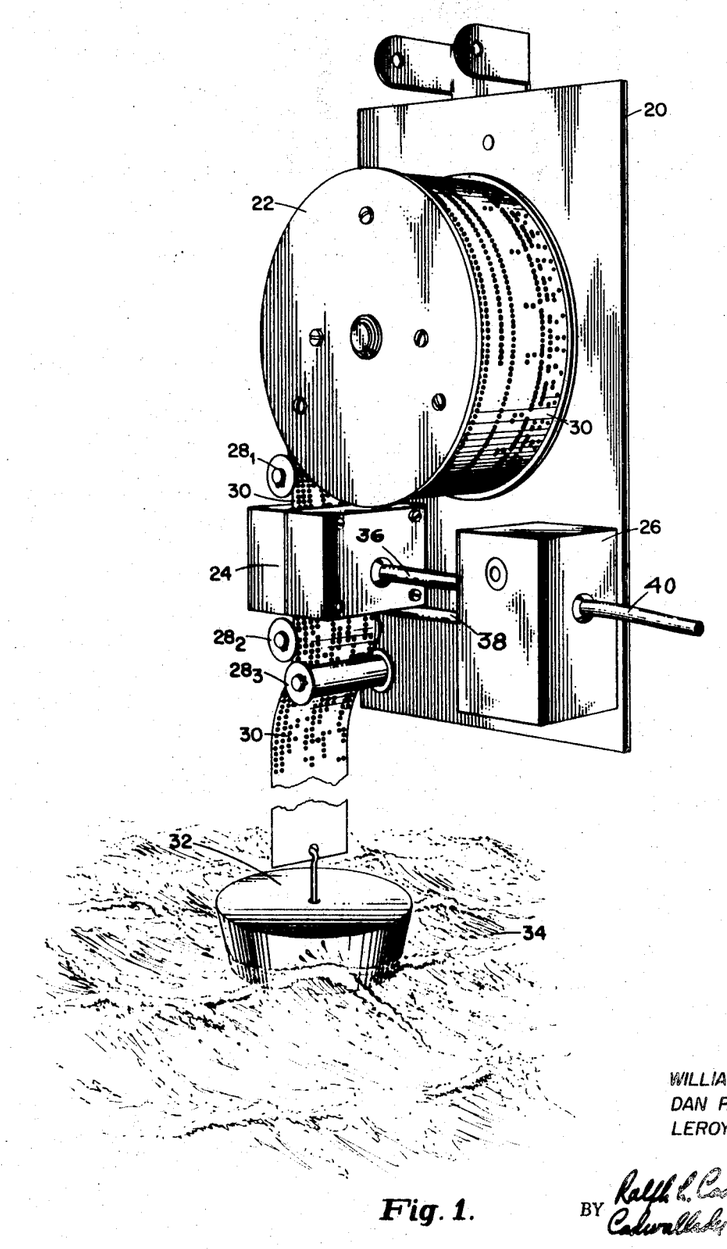
FIG. 1 is a perspective view of the combination of parts forming one embodiment of the present invention.

FIG. 1 illustrates somewhat schematically one embodiment of the system of the present invention in use for measuring liquid levels with its protective cover removed. Mounted on support 20 are tape storage reel 22, read head 24, electronics package 26 and guide rollers 28. Tape 30 connects at one end to tape storage reel 22, passes over guide roller $28_1$, threads through read head 24 and through guide rollers $28_2$ and $28_3$ and connects to weighted float 32 at its other end by any convenient means. Tape storage reel 22 is provided with a spring motor, not shown, desirably of the well-known type arranged to provide an approximately constant tension on the tape thus acting as a counterbalance which ordinarily maintains float 32 in an approximately constant rest position with respect to liquid surface 34. The spring motor provides insufficient tension to cause movement of weighted float 32 or of the object, the linear displacement of which is to be measured. Float 32 is weighted in excess of the constant tension provided by the spring motor. Cables 36 and 38 provide electrical connections between read head 24 and electronics package 26, while cable 40 provides electrical power to the system and necessary output connections.

Figure 2:
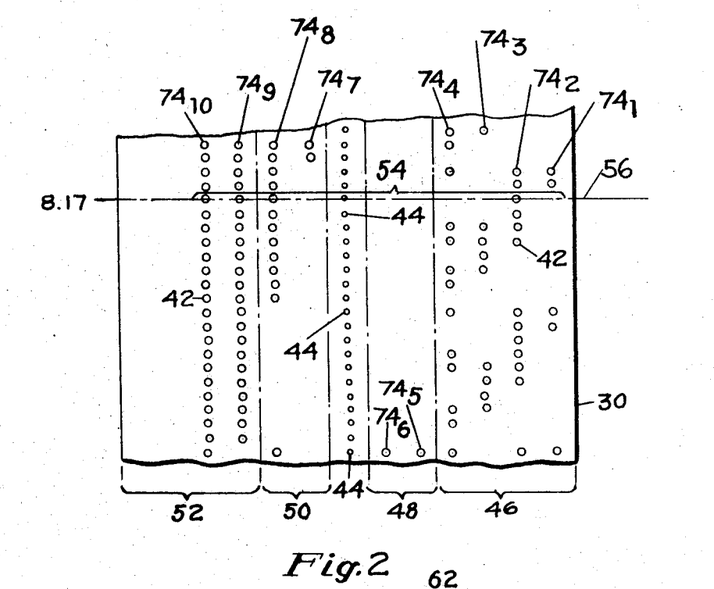
FIG. 2 is a fragmentary enlarged elevation of the coded tape illustrated in FIG. 1.

FIG. 2 illustrates an enlarged view of tape 30 as having a plurality of coded conduits in the form of perforations 42 and a plurality of displacement sensing conduits in the form of holes 44. The column of displacement sensing holes 44 runs lengthwise of tape 30 as illustrated and they may, for example, be positioned 0.01 foot apart. Such spacing may be made in nonlinear increments also. Perforations 42 in section 46 may be binary coded to represent hundredths of a foot. Perforations 42 in sections 48 and 50 taken together may likewise be binary coded to represent tenths of a foot. Similarly perforations 42 in section 52 may be coded to represent feet in units.

Associated with each displacement sensing hole 44 is a coded group of perforations 42 such as the group 54, aligned across tape 30 along dashed line 56 and illustrated as representing 8.17 feet. Note that the perforations illustrated in sections 46, 48 and 50, and 52 follow a cyclic binary system wherein only one binary digit changes between any two successive code groups for each of the coded hundredths, tenths and units respectively. Obviously any binary coding system may be used, although a code similar to the foregoing has the advantage that reading errors between two successive code groups are minimized.

Since displacement sensing holes 44 are located 0.01 foot apart and no readings are made unless the tape is in registration in the reading assembly, each associated code group 54 uniquely identifies every 0.01 foot level unambiguously.

Although code groups 54 and corresponding displacement sensing holes 44 are described above as identifying 0.01 foot levels of liquid depths unambiguously, they can also be treated as a table of values, each corresponding uniquely to other measured quantities such as Arizona miners' inches, acre-feet, gallons, millions of gallons, etc. when the dimensions of a particular forebay, weir, reservoir, etc. are known.

In FIG. 2 tape 30 may be a thin flexible steel ribbon with coded groups 54 of perforations 42 and associated displacement sensing holes 44 aligned across tape 30 and located 0.01 foot apart. Perforations 42 and displacement sensing holes 44 may have, for example, diameters of 0.070 inch and 0.030 inch respectively. In some applications where perforations 42 and displacement sensing holes 44 might become clogged the tape illustrated in FIG. 3 may be utilized.

Figure 3:
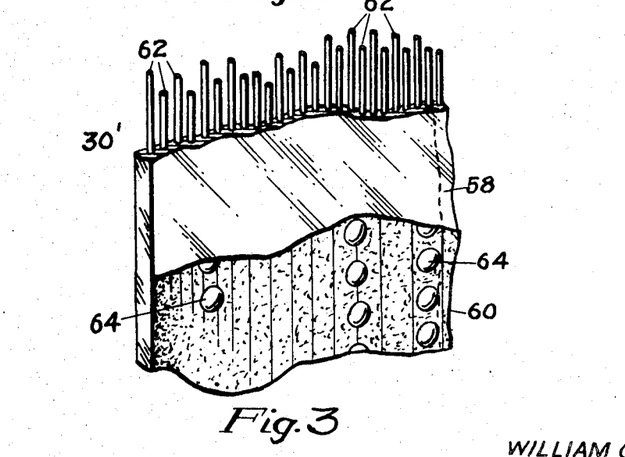
FIG. 3 is a sectional view of another tape that may be used in lieu of the tape of FIG. 2.

FIG. 3 illustrates tape 30' as comprising glass filament tape 58 to which is bonded photographic film 60. Glass filament tape 58 has a plurality of longitudinal glass filaments 62 which provide strength, support and stability of longitudinal dimension with changes in ambient temperatures. Photographic film 60 may be a negative with a plurality of conduits in the form of clear circles 64 thereon corresponding to the coded perforations 42 and displacement sensing holes 44 of FIG. 2. It may be made by photographing a coded pattern of black circles utilizing printed circuit photographic techniques. In a different embodiment glass filament tape 58 has a plurality of glass filaments impregnated in Teflon (polytetrafluoroethylene) and sandwiched with another Teflon ribbon having a metallic flashing. A photoresist process, such as is used in printed circuit board work, is used to etch light conduits through the flashing.

Figure 4:
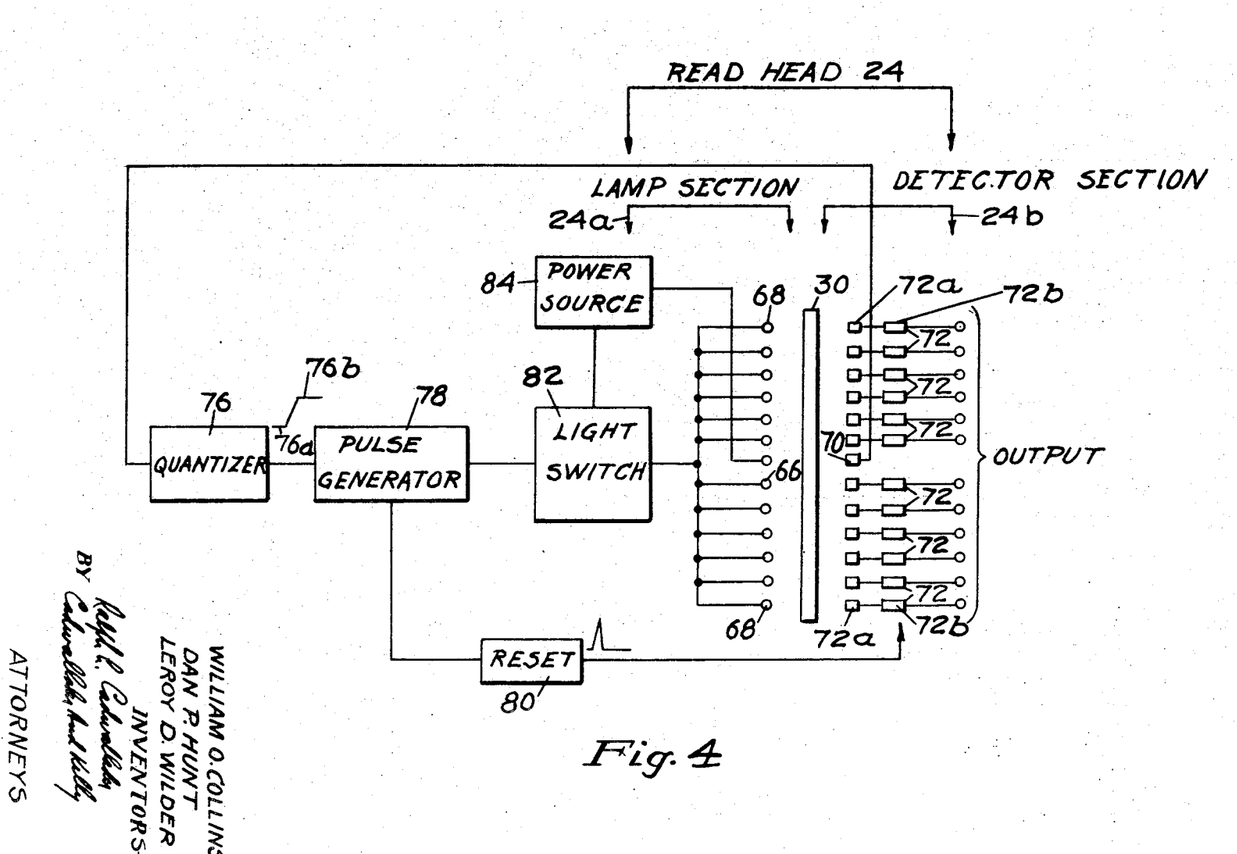
FIG. 4 is a schematic illustration partially in block diagram form of the system of the present invention.

As shown schematically in FIG. 4 read head 24 includes lamp section 24a and detector section 24b disposed on opposite sides of tape 30. Lamp section 24a comprises lamp 66 in line with the column of holes 44 and a set of lamps 68 opposite the columns of perforations 42. In detector section 24b there is a photodetector 70 positioned to detect light from lamp 66 through holes 44. Detector section 24b also contains a set of detector units 72 arranged to detect light from lamps 68 passing through holes 42 and to store the information thus obtained. Detector units 72 therefore serve as a register indicating for each column 74 the presence or absence of a perforation 42 in tape 30 at a particular position of the tape and thereby indentifies this position.

Each of the detector units 72 contains a photosensitive element 72a that detects light from a corresponding lamp 68 and a bistable element 72b that records the output of the element 72a whenever a reading is taken. In practice elements 72a and 72b may be combined in a single unit such as a light-activated silicon-controlled switch.

The output of photodetector 70 is applied to quantizer 76 whose output has one of two levels depending on whether or not a light transmitting hole 44 is positioned between lamp 66 and photodetector 70. Thus when an opaque portion of tape 30 is disposed between lamp 66 and photodetector 70 the output of quantizer 76 has a first value indicated as 76a. When a hole 44 begins to pass between lamp 66 and photodetector 70 the output of the photodetector increases and when it reaches the level to which quantizer 76 is set the output of the quantizer abruptly changes to a second value indicated as 76b. The abrupt change from level 76a to level 76b is converted by pulse generator 78 into a pulse applied to reset circuit 80 and light switch 82. At this point a row of holes 42 in the distance-indicating section of tape 30 is sufficiently well disposed between lamps 68 and detector units 72 to permit sensing of these latter holes.

Reset circuit 80 converts the relatively long pulse from pulse generator 78 to a short pulse which resets or clears bistable elements 72b in detector units 72 and thereby erases the previously recorded positions of tape 30. At the same time light switch 82 responds to the pulse from pulse generator 78 by connecting lamps 68 to power source 84. After lamps 68 have been on for an interval sufficiently long to ensure detection and recording of the light transmitted through holes 42 termination of the pulse from pulse generator 78 turns off switch 82 and thereby turns off lamps 68. The turning on and off of lamps 68 is generally desirable when the system is operated with battery power in a remote location. At this point detector units 72 are storing a number directly corresponding with the row of level-indicating holes 42 just sensed by the photosensitive elements 72a. This number, which is the output of the system, can be transmitted either in parallel or serially to a remote location where it is decoded to provide a useable indication of linear displacement. When the linear displacement changes sufficiently to bring another hole 44 into position between lamp 66 and photodetector 70 the process will be repeated and detector units 72 will then contain a new number indicating the new linear displacement.

ALTERNATIVE TAPES

Figure 5:
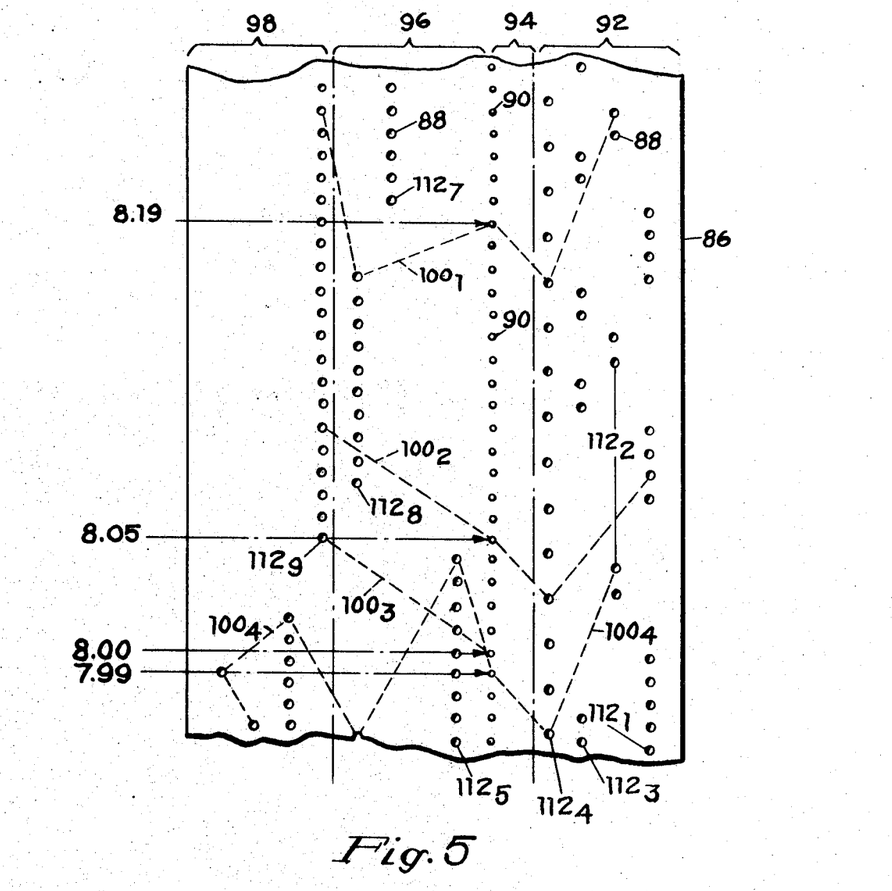
FIG. 5 is a fragmentary enlarged elevation of an alternative coded tape that may be used in lieu of the tape of FIG. 2.

In FIG. 5 tape 86 utilizes a folded hole pattern to compress the array of coded conduits 88 thus reducing the width of the tape. In actual practice, the use of this folded pattern permits handling of 13 data tracks plus a displacement sensing track on a tape just 1½ inches wide. Tape 86 has a plurality of coded conduits in the form of perforations 88 and a plurality of displacement sensing conduits in the form of holes 90. The column of displacement sensing conduits 90 runs lengthwise of tape 86, as illustrated and may, for example, be positioned 0.01 foot apart.

In the example of FIG. 5 perforations 88 are shown coded in a binary system to represent decimals of a foot similar to that described above with reference to FIG. 2. Thus, perforations 88 in section 92 may be coded to represent one-hundreths of a foot; those in section 96 may represent tenths of a foot and those in section 98, units. Note that no perforations 88 are shown in section 94 which may contain perforations representing another binary element.

Associated with each displacement sensing hole 90 in FIG. 5 is a coded folded group of perforations 88 such as the group $100_1$, which is illustrated as presenting 8.19 feet. Similarly, groups $100_2$, $100_3$ and $100_4$ represent 8.05, 8.00 and 7.99 feet respectively.

Figure 6:
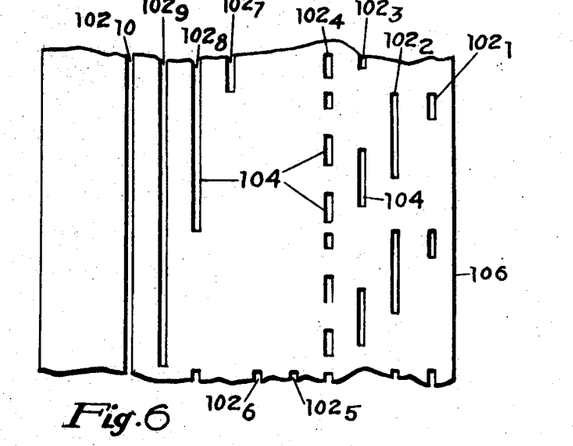
FIGS. 6, 7 and 8 are fragmentary enlarged elevations of other alternative coded tapes.
Figure 7:
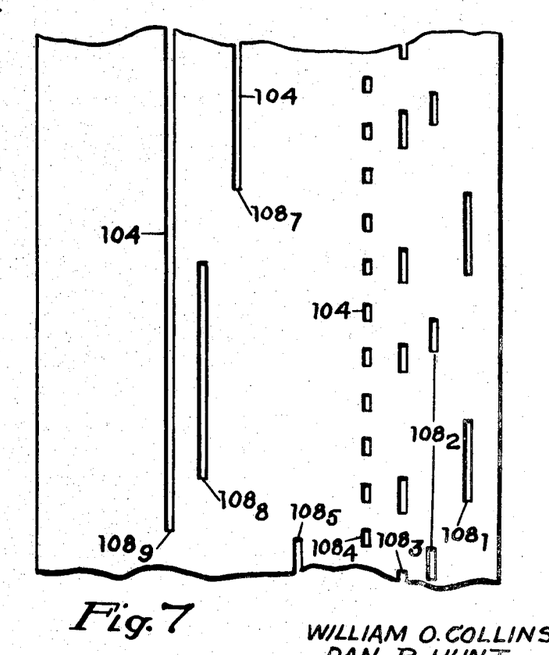
Figure 8:
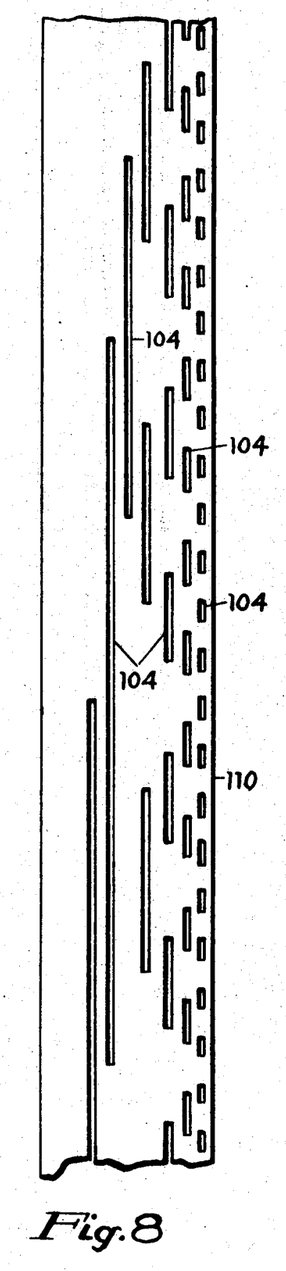

FIGS. 6, 7 and 8 show coded tapes somewhat similar to the tape of FIG. 3. These embodiments utilize the glass filament tape having a plurality of glass filaments impregnated in Teflon and sandwiched with another Teflon ribbon having a metallic flashing, which has already been described. The photoresist process etches light conduits through the flashing in the form of narrow strips 104 which correspond to columns of circular light conduits.

Referring now to FIGS. 2 and 6 it will be observed that individual columns 74 of perforations 42 correspond to individual columns $102_x$ of strips 104 as indicated by their subscripts. Note that tape 106 of FIG. 6 does not have a strip corresponding to the column of displacement sensing holes 44 of FIG. 2. Displacement sensing is not needed because the coded strips 104 continuously provide a reading of linear displacement accurate to within the least significant figure. Thus, referring momentarily to FIG. 4 a displacement reading may be taken by applying a command read pulse of sufficient time duration to light switch 82 and reset circuit 80.

Similarly, individual columns $108_x$ of strips 104 in FIG. 7 correspond by subscripts to individual columns $112_x$ of perforations 88 of FIG. 5.

Strips 104 illustrated in tape 110 of FIG. 8 are coded according to a reflected binary code (Gray code) the details of which are not shown.

VARIATIONS

In the above, spacing of displacement sensing conduits has been described in examples as being 0.01 foot. Such spacing may be made in nonlinear increments also. This freedom of increment spacing becomes particularly useful in situations where position change is nonlinearly related to a function being measured and reporting is desired only for changes in the variables that are deemed significant. For example, it is sometimes desirable to measure the contents of a spherical storage vessel with the readout expressed in gallons. In addition, it is sometimes desirable to limit the reporting to minimum changes, for example, not to indicate changes smaller than 10 gallons. Using the displacement measuring system of the present invention, the holes could be so spaced that they represent a 10-gallon change in capacity. The actual code pattern would be constructed to give the value in total number of gallons, but the reading would change only at even 10-gallon increments.

It will be obvious that the system can be connected to any object, the displacement of which is to be measured, it being understood, of course, that the tape will be disposed in the direction of linear displacement. In one application the tape was held stationary in its extended position along a rail-type track. The reader head was attached to a cart which traversed the track. Thus, the position of the cart could be accurately determined at a remote location at any time.

Operation of lamps 68 at one-half to two-thirds of their rated voltages increases their lifetime significantly. Their outputs in such event will tend to be in the infrared region. However, a number of photodetectors, and in particular the light-activated silicon-controlled switches mentioned above, have responses that are optimum in this region. Consequently, as used herein the term "light" is to be construed as covering the entire spectrum of radiation from ultraviolet through infrared.

Light switch 82 may be any circuit or device that turns on and stays on for the duration of an applied pulse. It may also be a bistable circuit that conducts when a short pulse is applied to it and ceases conduction when a reset pulse is applied. With such an arrangement the output level change of quantizer 76 may be applied directly to such a circuit, to a delay circuit having a predetermined delay and to reset circuit 80. The output of the delay circuit will reset the bistable circuit utilized in lieu of light switch 82. Moreover, reset circuit 78 may be any circuit that will provide a pulse having the required characteristics to reset bistable elements 72b or the light-activated silicon-controlled switches mentioned above. Quantizer 76 may be any circuit such as a Schmitt trigger circuit that responds to an input signal by providing a level change.

It will also be apparent that a transparent tape having opaque circles or opaque strips can be substituted for the tapes described above. Obviously the photodetector circuits will have to be rearranged to provide signals when no light impinges upon the photosensitive surfaces. With such an arrangement the number of lamps 68 will be drastically reduced.

SUMMARY

It will be apparent that rugged, lightweight electronic component parts can be selected for use in the system and the displacement measurement system herein described is itself economical, rugged, lightweight, self-contained and portable.

While there have been shown and described and pointed out the fundamental novel features of the invention, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

We claim:

1. A system for measuring the displacement of an object comprising: is
   an elongated tape having a plurality of groups of light conduits passing therethrough, located at predetermined points along the length thereof, with the conduits of each group disposed in a predetermined pattern on the tape and coded to indicate a function of displacement;
   means to which one end of the tape is connected for storing the tape and for permitting accumulation or release of the tape under substantially constant tension as the object moves, the other end of the tape being connected to the object; and
   a reader head arranged for movement of the tape therethrough comprising:
      a plurality of lamps disposed on one side of the tape;
      a plurality of photodetectors so disposed on the other side of the tape that when the light conduits of a code group are between the lamps and the photodetectors certain of the photodetectors are energized by light passing through the conduits to produce signals corresponding to the code group;
      bistable memory elements connected to the photodetectors for storing the signals and providing an output indication thereof; and
      a reset circuit connected to the bistable memory elements.

2. A system as in claim 1 in which the photodetectors and corresponding bistable memory elements are combined into light-activated, silicon-controlled switches.

3. A system as in claim 1 in which:
   the tape has a second plurality of light conduits located at predetermined points along the length thereof; and
   the reader head further comprises:
      an additional lamp disposed on the same side of the tape as the plurality of lamps and which is on continuously during operation of the system;
      an additional photodetector disposed on the other side of the tape, the second plurality of light conduits also being located to permit registration as the tape moves at such points of the additional lamp and additional photodetector;
      a quantizer circuit having the output of the additional photodetector as an input for producing in response thereto an output signal having an abrupt level change;
      a power source;
      a switching circuit connected between the plurality of lamps and the power source; and
      a pulse generator circuit having the output of the quantizer circuit as in input for producing in response to the abrupt level change thereof an output pulse of predetermined time duration which pulse is applied to turn on the switching circuit for the time duration of the pulse and is applied to the reset circuit.

4. A system for measuring the displacement of an object comprising:
   a transparent, elongated tape having a plurality of groups of opaque indicators located at predetermined points along the length thereof, with the indicators of each group disposed in a predetermined pattern on the tape and coded to indicate a function of displacement;
   means to which one end of the tape is connected for storing the tape and for permitting accumulation and release of the tape under substantially constant tension as the object moves, the other end of the tape being connected to the object;
   fixed means for detecting the indicators in a group in juxtaposition thereto, for providing signals corresponding thereto, for storing the same and for providing an output thereof, said fixed means comprising:
      light-producing means disposed on one side of the tape;
      dark-sensing means so disposed on the other side of the tape that when the indicators of a coded group are between the light-producing means and the dark-sensing means, the dark-sensing means are actuated to produce signals corresponding to the coded group; and
      means for erasing the stored signals.

5. A system as in claim 4 in which the opaque indicators are strips.

6. A system as in claim 4 in which the opaque indicators are circles.

7. A system for measuring the displacement of an object comprising:
   an elongated tape having a first plurality of groups of light conduits passing therethrough, spaced at predetermined intervals along the length thereof, with the conduits of each group disposed in a predetermined pattern on the tape and coded in a folded pattern to indicate a function of displacement;
   a support;
   a storage reel connected to one end of the tape and mounted on the support and having a spring motor arranged to maintain constant tension on the tape as the tape is accumulated or released, the other end of the tape being connected to the object;
   a reader head mounted on the support and arranged for movement of the tape therethrough, the reader head comprising:
      light-producing means disposed on one side of the tape;
      light-sensing means so disposed on the other side of the tape that when the light conduits of a coded group are between the light-producing means and the light-sensing means, the light-sensing means are energized by light from the light-producing means to produce signals corresponding to the coded group;

memory means for storing the signals produced by the light-sensing means; and means actuated by movement of the tape for actuating the light-producing means comprising:
- a sensing lamp disposed on one side of the tape and continuously actuated when the system is actuated;
- a photodetector oppositely disposed on the other side of the tape;
- a second plurality of light conduits located at predetermined points lengthwise of the tape and arranged to permit registration at each of said points of the sensing lamp and the photodetector; and
- means responsive to the output of the photodetector for resetting the memory means and for actuating the light-producing means.

8. A system according to claim 7 in which the tape comprises a plurality of glass filaments impregnated in Teflon sandwiched with a Teflon ribbon having a metallic flashing and the conduits of the first plurality of groups of light conduits are narrow coded strips etched through the metallic flashing.

9. A system according to claim 7 in which the tape comprises a glass filament tape to which is bonded a photographic film negative and the light conduits are clear circles on the photographic film negative.

10. A system according to claim 7 in which the tape is thin stainless steel and the light conduits are perforations therethrough.

11. A system as in claim 7 in which:
- the light-producing means comprises a plurality of lamps; and
- the light-sensing means comprises a light-activated silicon-controlled switch corresponding to each of the plurality of lamps.

PO-1050
(5/69)

UNITED STATES PATENT OFFICE
CERTIFICATE OF CORRECTION

Patent No. 3,558,861　　　　　　　　　Dated January 26, 1971

Inventor(s) William O. Collins; Dan P. Hunt; Leroy D. Wilder

It is certified that error appears in the above-identified patent and that said Letters Patent are hereby corrected as shown below:

Column 5, line 47, delete "is".

Column 6, line 41, after the semicolon, add --and--.

Column 6, line 69, after the semicolon, add --and--.

Signed and sealed this 29th day of June 1971.

(SEAL)
Attest:

EDWARD M. FLETCHER, JR.　　　　　　　WILLIAM E. SCHUYLER,
Attesting Officer　　　　　　　　　　Commissioner of Paten